United States Patent [19]

Ukai et al.

[11] 4,325,401
[45] Apr. 20, 1982

[54] ASEPTIC VALVE

[75] Inventors: Nobuo Ukai, Machida; Akira Funado, Funabashi; Tethuya Yokota, Mathudo, all of Japan

[73] Assignee: Kagome Co., Ltd., Japan

[21] Appl. No.: 73,271

[22] Filed: Sep. 7, 1979

[30] Foreign Application Priority Data

Sep. 28, 1978 [JP] Japan .................................. 53-118622

[51] Int. Cl.³ ............................................ F16K 51/00
[52] U.S. Cl. .................................. 137/240; 137/454.2
[58] Field of Search ............................ 137/240, 454.2; 251/318

[56] References Cited

U.S. PATENT DOCUMENTS

| | | | |
|---|---|---|---|
| 3,556,360 | 1/1971 | Stelson | 137/240 |
| 3,605,789 | 9/1971 | Graham | 137/240 |
| 4,144,901 | 3/1979 | Stevenson | 137/240 |
| 4,197,873 | 4/1980 | Minojue et al. | 137/240 X |

Primary Examiner—A. Michael Chambers
Attorney, Agent, or Firm—Robert E. Burns; Emmanuel J. Lobato; Bruce L. Adams

[57] ABSTRACT

An aseptic valve for regulating supply and discharge of a semi-processed food product in an aseptic storage tank. The valve is provided with a valve body on which is mounted a bonnet housing a bushing. These three elements define three chambers in which a sterilizing liquid is retained. The three chambers bathe parts of the three principal parts of the valve with the sterilizing fluid and maintain paths of entry of microorganisms blocked by the sterilizing liquid so that the valve and the system to which it is connected are maintained sterile.

7 Claims, 13 Drawing Figures

ASEPTIC VALVE

BACKGROUND OF THE INVENTION

This invention relates generally to valves and more particularly to an aseptic valve for use in food product processing and the like.

In the food processing field agricultural food products gathered from a farm are not immediately processed into a final form of processed food. These agricultural food products have seasonal characteristics and are harvested in large quantities. These food products are partially processed and are temporarily stored as primarily-processed food products and are then processed into final food products as they are withdrawn from storage.

An example is tomatoes which have seasonal characteristics and are harvested in large quantities. They are not immediately processed into final food products such as tomato sauce, tomato ketchup or the like. They are first primarily-processed and are stored as a puree or a paste. The primarily-processed food products are then processed into final processed food products as they are withdrawn from storage containers.

A most important aspect of the production of processed food products is to store the primarily-processed food products in a perfectly sterilized state. Storage of primarily-processed food products in a large storage tank is presently the most effective used method. When the primarily-processed food products are stored in a large storage tank the temperature must be kept as low as possible taking into consideration the possibility of deterioration and viscosity resistance thereof. In addition, much attention must be given to the microbiological contamination of the primarily-processed food products. The contamination of supply and discharge pipes connected to a large storage tank in which a primarily-processed product is stored, the contamination of a valve disc for restricting the supply and discharge of the primarily-processed food product and of the tank itself and accessory parts attached thereto, and the entry of microorganisms which may contaminate the product stored in the tank, must not take place, even if such contamination is extremely small.

Methods of and apparatus for storing primarily-processed food products in an aseptic manner have been disclosed in, for example, U.S. Pat. Nos. 3,871,824; 3,918,678; 3,918,942; 3,951,184; and 3,998,589 issued to Rechtsteiner et al. Among these patents, U.S. Pat. No. 3,918,678 entitled "Aseptic Bulk Material Storage System" is directed to an aseptic valve for use in storing primarily-processed agricultural products in a large tank under aseptic conditions.

SUMMARY OF THE INVENTION

An object of the present invention is to improve the engaging condition of an aseptic valve stem, construction of an aseptic valve disc, and other elements by increasing the contact areas thereof, and to effect stable contact between a valve disc or element secuted to the valve stem and a valve seat of the body while minimizing the slipping of the valve stem and thereby prevent the entry of micro-organisms between the stem and other valve construction element.

Another object of the present invention is to provide around a valve stem of an aseptic valve a sterile chamber filled with a chemical sterilizing liquid whereby the stem is sterilized to prevent the entry of micro-organisms between the stem and other valve construction elements, the to keep the stem in contact with a constantly fresh sterilizing liquid having a high sterilizing effect and thereby perfectly prevent the microbiological contamination of the apparatus from between the valve stem and other valve elements.

Still another object of the present invention is to eliminate recesses or the like in a valve cavity in a valve body in which a fluid may be collected, so that the valve cavity can be easily washed and sterilized and to eliminate recesses or the like in a valve cavity which may cause microbiological contamination of the apparatus.

A further object of the present invention is to minimize flow resistance of a fluid within the valve cavity.

Still another object of the present invention is to prevent microbiological contamination at the joint portions of an aseptic valve and storage tank, joint portions of the aseptic valve and supply and discharge pipes, and joint portions of aseptic valves.

The aseptic valve according to the invention has a valve body with a bonnet fixed thereto having a circumferential recess jointly with the valve body inner surfaces defining a first chamber through which a sterilizing liquid is supplied. The bonnet has an axial recess within which is snugly housed a bushing. The bushing has a circumferential recess extending axially between the opposite ends and an axial bore having a greater internal diameter along a length between the opposite ends. The cirferential recess defines a second chamber with the surfaces of the bushing defining the axial recess thereof. A valve stem extends axially through the bonnet and the bore of the bushing defining with the greater diameter of the axial bore of the bushing a third chamber in communication with the second chamber through a passageway in the bushing.

Provision is made for supplying a sterilizing liquid in the three chambers through suitable inlets and outlets in the valve body and bushing. The valve is sealed by a plurality of O-rings disposed between the valve body and bonnet, valve stem and the stem and bushing.

BRIEF DESCRIPTION OF THE DRAWINGS

These objects as well as advantageous features of the present invention will become more apparent from the following description of a preferred embodiment with reference to the accompanying drawings in which.

DESCRIPTION OF THE PREFERRED EMBODIMENT

Figure 1:
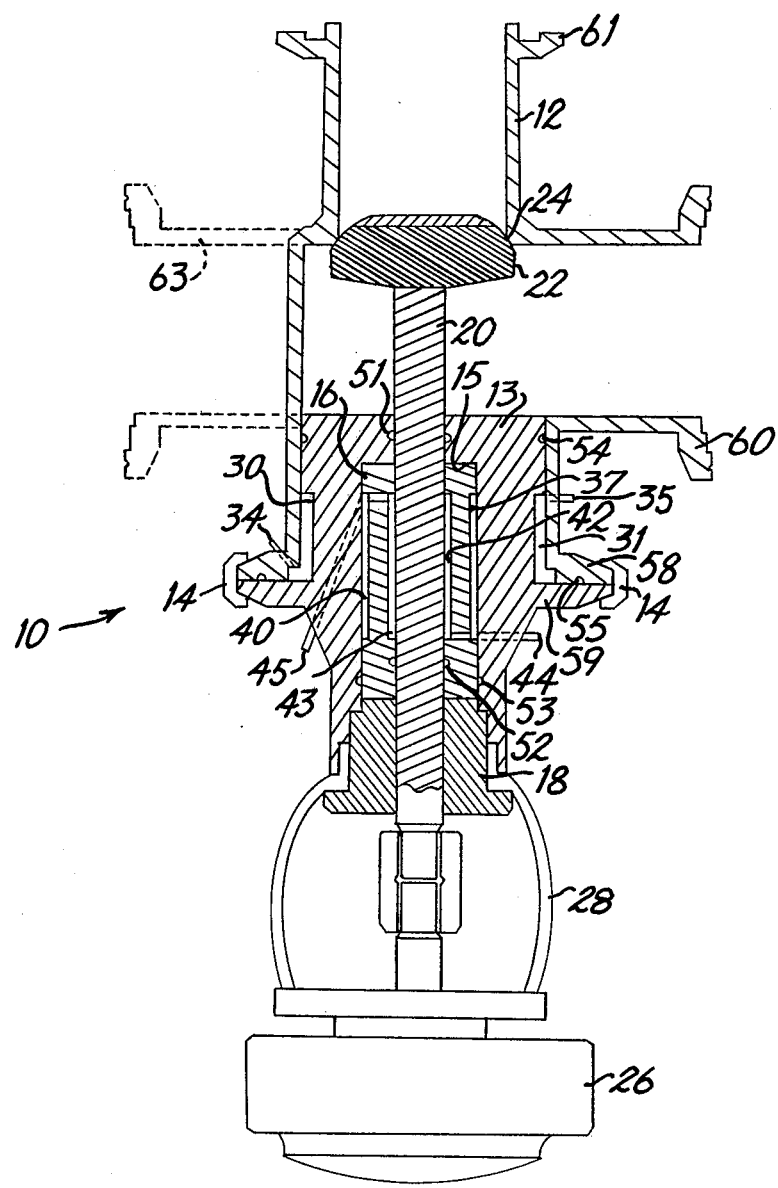
FIG. 1 is a cross-section view of an embodiment of an aseptic valve according to the present invention.

An aseptic valve construction embodying the present invention is illustrated in FIG. 1. A valve 10 comprises a valve body 12 removably connected to a bonnet 13 by a connector 14. The valve bonnet is provided with an axial recess 15 within which is snugly housed a bushing 16. The bushing is kept in place by a plug or cap 18. A valve stem 20 extends axially through the cap, bushing and bonnet and is fixed to a valve element or disc 22 which seats on a seat 24 for closing and opening the valve by a manual actuator 26 connected to the valve stem and mounted on a bracket 28 clamped between the bonnet and plug or cap 18.

Provision is made in the aseptic valve to sterilize the valve with a sterilizing liquid replenished and renovated or renewed to maintain sterile conditions. Thus the bonnet is provided with a circumferential recess 30 that forms a first chamber 31 jointly with the valve body when the bonnet is mounted on the valve body. A sterilizing liquid is provided into the chamber, 31, from a source not shown, through an inlet 34 through the valve body and is discharged through an outlet 35 through the valve body.

The bushing 16 is provided with a circumferential recess 37 extending axially between the opposite ends thereof which defines a second chamber 40 jointly with surfaces of the bushing defining the axial recess 15. The bushing has an axial bore 42 having an axial length with a major diameter. The axial length of the bore corresponds to the axial length of the circumferential recess. The valve stem and the portion of the axial bore of the bushing having a major diameter jointly define a third chamber 43. A passageway, not shown in the bushing provides communication between the second and third chambers. A sterilizing liquid is provided in the first and second chambers through a passage inlet 44 through the bonnet and is discharged through passage outlet 45 through the bonnet. The sterilizing liquid can be renewed as desired.

In order to maintain a tight seal a plurality of O-rings are disposed between the valve parts to maintain the sterilized integrity of the valve. An O-ring seal 51 is provided between the valve stem and the bushing and it and a second O-ring seal 52 seal the shaft length bathed by sterilizing liquid in the second chamber. An O-ring seal 53 in conjunction with the first seal 51 seals the bushing and the bonnet. Two O-ring seals 54,55 effectively seal the bonnet and bushing and the latter seal 55 effects a seal at the joint of two flanges 58,59 on the valve body and bonnet respectively about which the connector 14 is circumferentially disposed.

The aseptic valve construction allows for easily disassemblying the valve for cleaning the parts thereof. The valve stem is sealed and the sterilizing liquid in the chamber precludes bateria or microorganisms entering into the processed food products along the valve stem and other elements. This minimizes contamination of the stored food products in a system employing aseptic valves according to the invention.

The aseptic valve body and bonnet are provided with flanges 58,59 for connection to each other. The valve body has flanges 60, 61, 62 for effecting connection to other components in a processed food storage system as later explained. Moreover, aseptic valves according to the invention can be made as valves for different flow of directions as shown by broken lines at 63.

Figure 2:
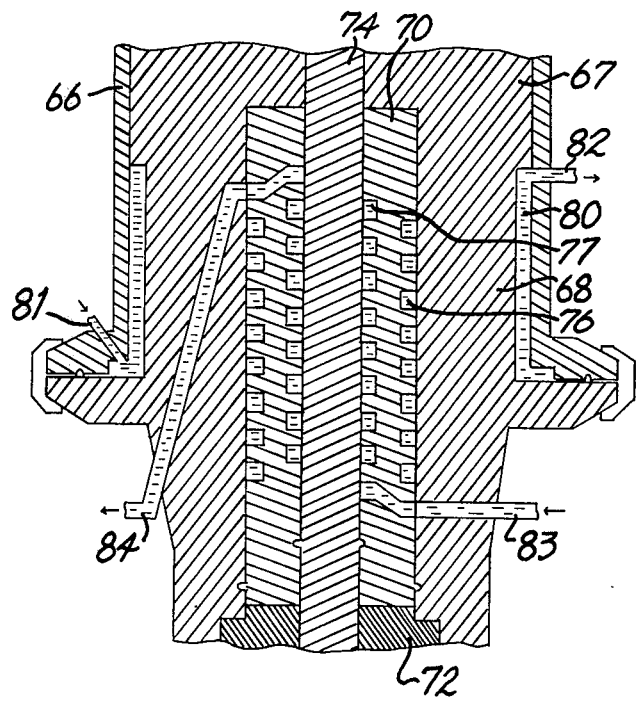
FIG. 2 is a fragmentary cross-section view on an enlarged scale illustrating the flow of a chemical sterilizing liquid in the sterile chambers formed between a valve stem and other elements.
Figure 3:
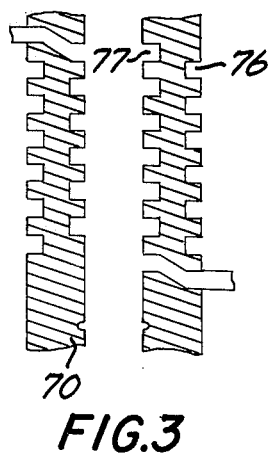
FIG. 3 is a fragmentary cross-section view, on enlarged scale, of a bushing, in which the valve stem is fitted.
Figure 4:
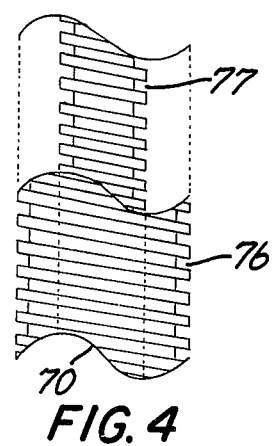
FIG. 4 is a fragmentary perspective view of the bushing shown in FIG. 3, and illustrates the inner and outer surfaces thereof.

A second embodiment or construction of an aseptic valve is illustrated in FIGS. 2-4 inclusive. In this construction a valve body 66 houses a bonnet 67 constructed as before described and removably joined to the valve body. In this embodiment a bushing 70 is housed in the bonnet and held therein by a plug 72 and through which a valve stem 74 extends. This construction differs in the construction of the bushing. The bushing has a spiral groove 76 on the periphery thereof and an internal spiral groove 77.

A first chamber 80 for sterilizing fluid is provided as described heretofore. The spiral grooves 76,77 have a square cross section and correspond to the second and third sterilizing fluid chamber heretofore described with respect to the embodiment in FIG. 1. A sterilizing fluid is provided to the first chamber through an inlet 81 and is discharged through an outlet 82. Sterilizing liquid is provided to the grooves through an inlet 83 and discharged through an outlet 84. The two grooves have their end convolutions connected to so that they are in communication with each other as can be understood from the drawings.

This second construction of the bushing provides greater guiding contact of the bushing 70 with the valve stem 74 and maintains the valve stem portion bathed by the sterilizing liquid sterile and precludes entry of micro-organisms along the valve stem and the valve structure is sealed as before described.

The bushing spiral grooves are complex to machine. The bushing 70 can be molded from a fluoric resin which has a suitable hardness and a high resistance to sterilizing chemicals. Moreover, since there is greater contact between the valve stem and bushing it can also be made of "TEFLON" to reduce friction wear.

Figure 5:
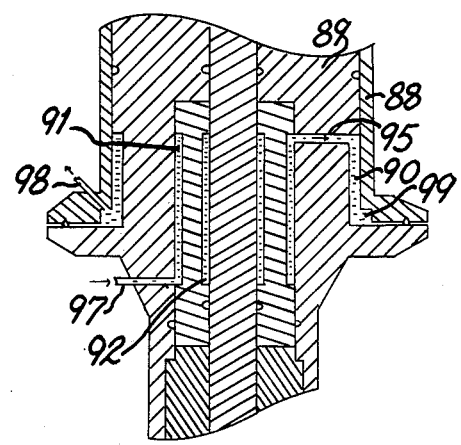
FIG. 5 is a fragmentary cross-section view illustrating another type of flow of a chemical sterilizing liquid according to the present invention.

The aseptic valve according to the invention can be constructed with the sterilizing liquid chambers therein somewhat differently arranged. A third embodiment is illustrated in FIG. 5. In this embodiment a valve body 88 houses a bonnet 89 and a sterilizing chamber 90 is formed therebetween. The aseptic valve has a second and a third sterilizing chamber 91,92 respectively formed in a manner before described. In this construction a passageway 95 provides communication between the second and first chambers 91,92 and a passageway, not shown, in the bushing provides communication between the second and third sterilizing liquid chambers are in communication and a single inlet 97 is provided through the bonnet to the second chamber and a single outlet 98 through the valve body is in communication with the first chamber 90.

It should be noted that the first chamber 90 in this construction and in each of the prior constructions has an offset portion 99 that effects a sterilizing seal along the surfaces of jointure between the valve body 88 and bonnet 89. O-ring seals are provided as before described.

Figure 6:
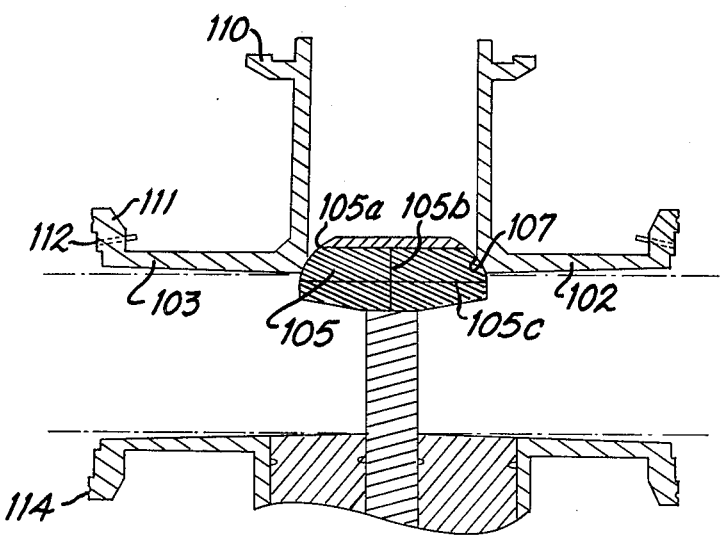
FIGS. 6 and 7 are fragmentary cross-section views illustrating the shapes of valve cavities.

The aseptic valve construction according to the invention provides structure for easy or optimum flow of the processed food product therethrough. As shown in a three direction valve in FIG. 6 the valve cavity therein is defined by conduit portions 102,103 of the valve body that increase in internal diameter in a direction away from a valve element 105 toward the valve openings to reduce resistance to the flow of a partially-processed food product flowing therethrough, for example. Moreover, this allows easier cleaning of a system with a cleaning or sterilizing fluid and reduces the possibility of the food product remaining in the valve cavity.

The valve element or disc 105 is constructed with a smooth rounded surface 105a that reduces resistance of flow through the valve. An arcuate valve seat 107 provides a tight seal to reduce contamination. The valve disc has a thickness or minor diameter 105b which is less, about $\frac{1}{2}$-$\frac{1}{3}$, of a major diameter 105c taking into consideration the mechanical characteristics and mechanical strength thereof.

The aseptic valve is provided with flanges such as those shown at 110,111 some of which are provided with a connection for a sterilizing fluid as later described. The configuration of the flanges is such as to function to define a cavity with connection flanges of other elements as later explained with respect to FIG. 8. The connection flanges constructed similar to the flange connection designated 112 are provided with an annular recess 114 for receiving an O-ring seal therein.

Figure 7:
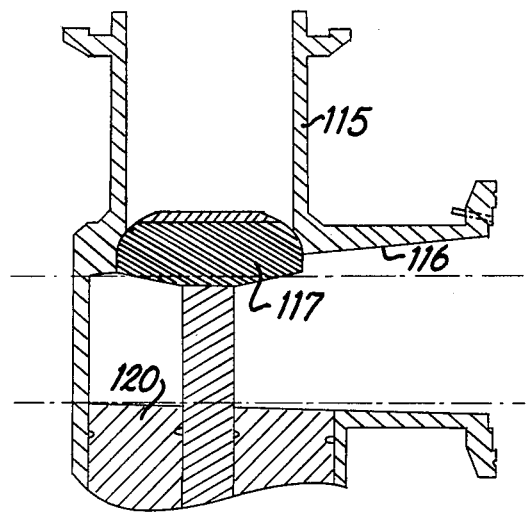

A two-way valve is illustrated in FIG. 7 and it has a valve body 115 in which an outlet portion flares 116 outwardly in the direction of outward flow. The valve is provided with a valve disc 117 similar to the constructions or embodiments heretofore illustrated.

It should be noted the flaring is not uniform but is greater in that portion of the outlet adjacent the valve disc 117. Moreover, it can be seen that a valve bushing 120 moreover provides a flaring or enlargement of the cavity which is not uniform as against a uniform flaring of the cavity in the embodiment in FIG. 6 including a bushing therein.

Figures 8, 9:
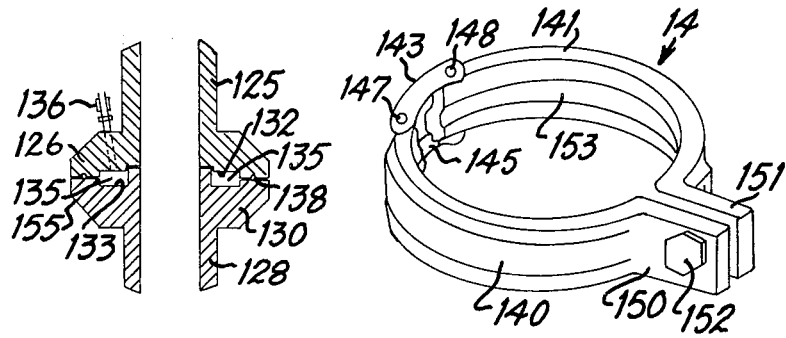
FIG. 8 is a fragmentary cross-section view of an aseptic valve connected to another construction element.
FIG. 9 is a perspective view of a joint connector used for releasably joining or connecting portions of the aseptic valve and connecting the valves with other elements such as shown in FIG. 8.

The manner in which the flange connections of aseptic valve function in a connection is illustrated in FIG. 8. In this figure a valve body 125, shown fragmentarily, is provided with a connection flange 126. Another element 128 has a flange 130 for connection. The two flange connections are provided with respective recesses 132, 133 which jointly define a cavity 135 to which is supplied a sterilizing fluid through an inlet 136. Flat, marginal surfaces of the flanges are disposed opposed to each other as shown enclosing the cavity and between which is disposed an O-ring seal 138. Thus all connections are sealed with a sterilizing fluid to preclude entry of micro-organisms into a system within which aseptic valves according to this invention are used.

The flange connections illustrated in FIG. 8 are circumferentially releasably clamped by a connector or clamp 14 as illustrated in FIGS. 1 and 9. The clamp is constructed as two semi-circular halves 140, 141 pivotally connected by two pivotal links 143, 145 pivoted on pins 147, 148 so that the two halves can be opened to enclose a joint or connection then closed circumferentially about it. The two halves are provided with extending lugs 150, 151 through which a bolt 152 extends for fixing the clamp in a closed position. The inner insurfaces 153 of the clamp are configured in cross section to fit over the bevelled peripheral surface 155 of the flanges and correspond therewith as illustrated in FIG. 1 with respect to the connection of valve body and bonnet therein.

Figure 10:
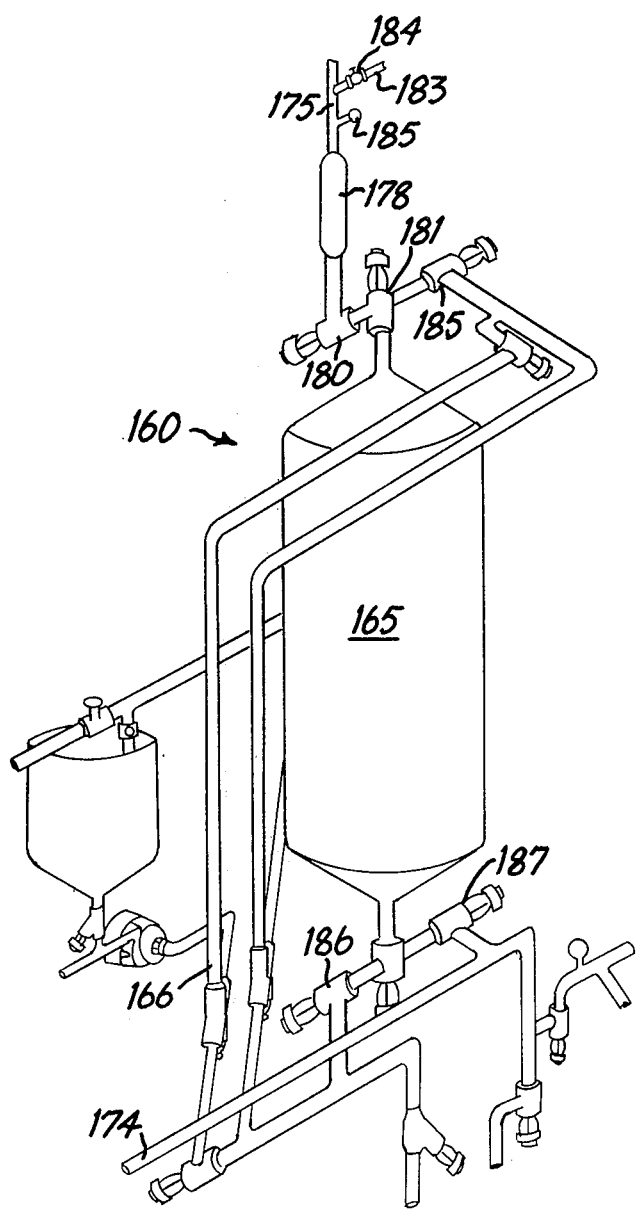
FIG. 10 is a perspective view of an installation illustrating the aseptic valve, according to the invention in use on a foodstuff storage tank.

A sterile storage tank system 160 in which aseptic valves according to the invention are used is illustrated in FIG. 10. A sterile storage tank 165 is illustrated for storing of primarily-processed food products before being finally processed. The storage tank is provided with a processed food supply line 166 and a discharge line 174. An inert septic gas is provided through a septic gas supply line 175 through a microbiological filter 178 and a pair of series aseptic valves 180,181 according to the invention. The inert aseptic gas is provided under a controlled pressure from a source not shown. A steam sterilizing connection 183 is provided with a shut-off valve 184 for sterilizing the system. A gauge 185 permits visually monitoring the internal pressure in the storage tank 165.

The processed food product storage system 160 is provided with a plurality of aseptic valves 185,186,187 constructed according to the invention.

Figure 11:
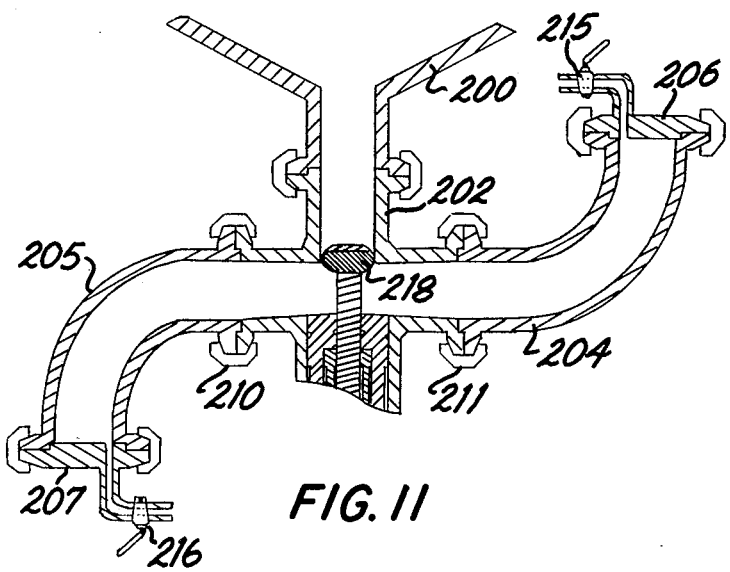
FIGS. 11-13 are fragmentary cross-section views of the aseptic valve used in a storage tank installation to keep the same in a sterilized condition.
Figure 12:
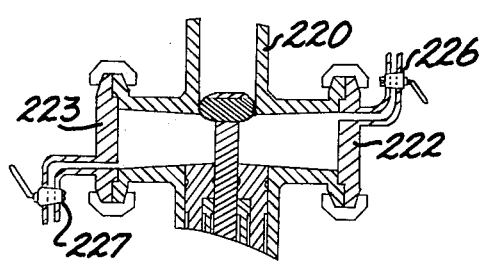
Figure 13:
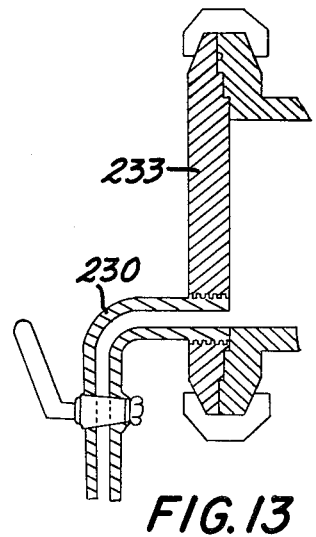

In order to preclude contamination by micro-organisms of a primarily-processed food product stored pending final processing the valves and storage tank can be isolated as illustrated in FIGS. 11-13. A storage tank 200 is illustrated fragmentarily and its bottom is connected to an aseptic valve 202. This valve is disconnected from the system and is connected to two removably connected similar constructed curved tubes or adapters 204,205 having connection flanges of the type described heretofore. The tubes are closed at their free ends by blanks 206,207 having marginal peripheral surfaces that cooperate with flanges on the tubes constructed as heretofore described as to the connection flanges. The tubes are removably connected to the valve flanges by circumferential connectors 210 of the type disclosed in FIG. 9. The blanks are likewise similarly removably connected to the tubes.

The tubes 204, 205 are intended to be filled with a sterilizing liquid which maintains the cavity of the aseptic valve 202 completely filled. Provision is made in the blanks for filling the tubes with a sterilizing liquid and periodically replacing it with fresh liquid through inlet and outlet tubes provided with plug valves 215,216. In this manner the tank can be isolated and the contents therein kept sterile with minimum risk of contamination by micro-organisms.

The aseptic valve 202 illustrated in FIG. 11 is constructed as described heretofore. It is provided with a valve disc 218 that has an underside somewhat more curved at the periphery.

Other illustrations of the isolation of aseptic valves are shown in FIGS. 12 and 13. An aseptic valve 220 is illustrated as having blanks 222,223 connected directly onto the valve. These blanks are likewise provided with inlet and outlet tubes for a sterilizing liquid controlled by plug valves 226,227. A construction in which a tube 230 for sterilizing liquid is threaded into a blank 233 for closing an opening, whether on a tube or valve, for containing sterilizing liquid is illustrated in FIG. 13.

Those skilled in the art will understand that the invention provides aseptic valve constructions that can be used for maintaining a processed food storage system completely sterile. The sterilizing liquid used according to the invention includes iodine or chlorine.

What we claim is:

1. An aseptic valve for use in regulating supply of a liquid foodstuff comprising, a valve body, a bonnet having a circumferential recess jointly with said valve body defining a first chamber, said bonnet having an axial recess, a bushing snugly fitting in said axial recess and having a circumferential recess jointly with surfaces defining said axial recess defining a second chamber and having an axial bore having a length thereof with a greater diameter between opposite ends of the bore, a valve stem extending axially through said bonnet and said bore defining with the greater diameter of said bore a third chamber, a part of said bushing providing communication of said third chamber with jointly with said valve body defining a first chamber for containing a sterilizing liquid therein, a bushing housed in said bonnet defining jointly with said bonnet a second chamber for containing a sterilizing liquid therein, said bushing having internal surfaces comprising an internal axial bore defining a third chamber for containing a sterilizing liquid therein and in communication with at least said second chamber, means on said valve defining